United States Patent Office 3,310,841
Patented Mar. 28, 1967

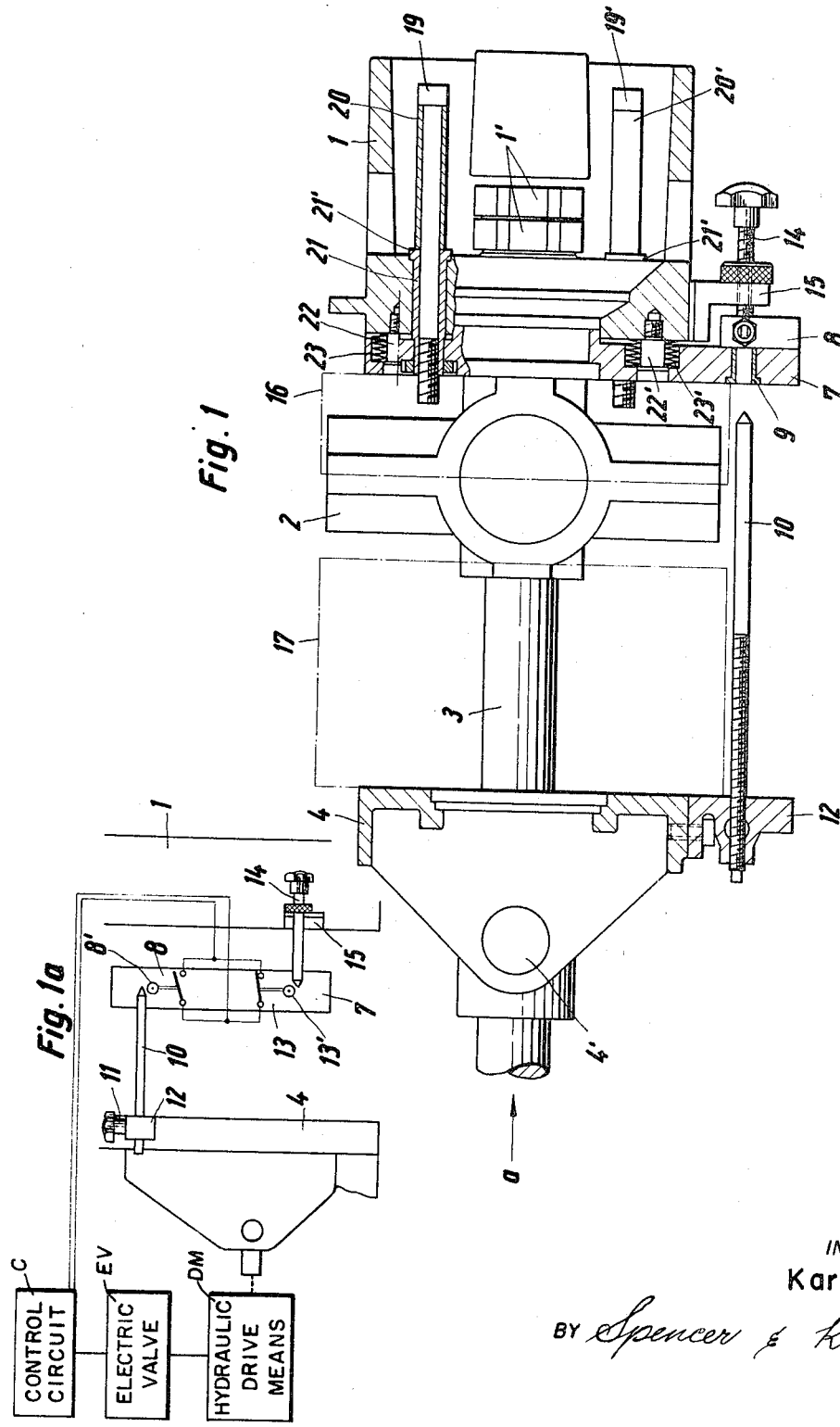

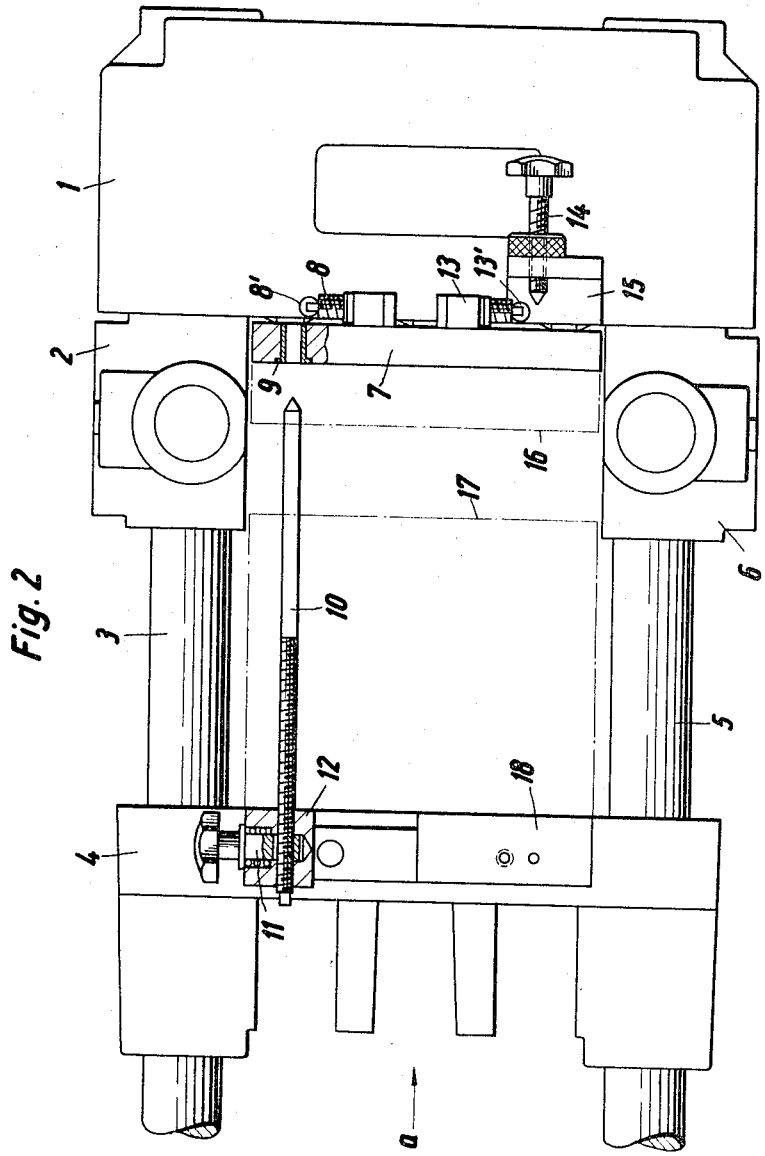

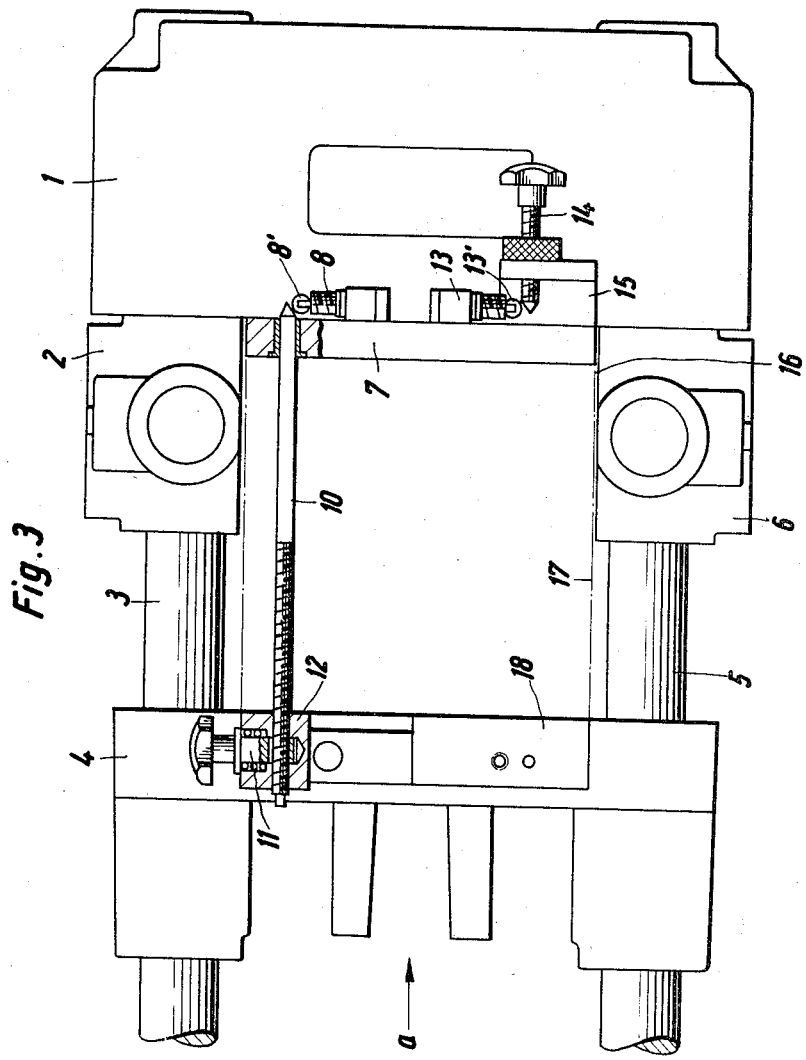

3,310,841
SAFETY DEVICE FOR INJECTION MOLD
CLOSING MACHINE
Karl Hehl, Lossburg, Wurttemberg, Germany, assignor to
Arburg Maschinenfabrik Hehl & Söhne, Lossburg,
Wurttemberg, Germany
Filed May 1, 1964, Ser. No. 364,216
Claims priority, application Germany, July 31, 1963,
A 20,385
11 Claims. (Cl. 18—30)

The present invention relates generally to a hydraulically actuated safety mold closing unit of an injection molding machine for thermoplastic materials, and, more particularly, to such a unit which prevents the casting mold halves from being pressed together under closing pressure when a foreign body is present between the casting mold halves.

In injection molding machines which render it possible to inject transversely to the parting line or plane of the casting mold as well as to inject into the parting plane, that is, injecting while the injection cylinder is positioned at right angles to the direction of movement of the mold clamping device, it is undesirable to have all of the guiding and clamping means of the mold closing device positioned on one side of the parting line or plane mounted for axial displacement. The reason for this is that there is no frame of the mold clamping device which is entirely stationary and this is required for exact guidance and support of the casting mold halves. In such a case, the clamping unit has its firmness or structural stability impaired so that twisting and certain displacement and thus irregularities in the shape of the injection molding can not be avoided when strong lateral stresses are exerted upon the mold clamping device.

A further disadvantage of safety mold closing units known per se is that they do not react with sufficient sensitivity to all operating conditions as for example when processing plastic having a tendency to "thread formation." Thread formation describes what occurs when in ejecting the injection molded article from the mold, the injection channel remains united with the nozzle mouth or end of the injection cylinder via a thin plastic thread. This thread or parts of it may adhere between the opened halves of the casting mold where they cause indentations in the surfaces of the casting mold halves when the mold is closed again under pressure of, for example, several tons, caused by the clamping device for the molding. During the course of further operations, additional plastic material enters the parting plane of the casting mold along the indentations. The material thus entering causes further indentations.

With these defects of the prior art in mind, it is a main object of the present invention to provide a safety mold closing unit of the character described which provides for the reversal of the direction of movement in the presence of even the smallest of foreign bodies between the casting mold halves.

Another object is to provide a device of the character described in which the entire unit has sufficient stability for injection into the parting plane of the casting mold and which is accomplished with a minimum technical expenditure.

These objects and others ancillary thereto are accomplished in accordance with preferred embodiments of the invention wherein portions of the unit moved in the closing direction are arranged to actuate electromechanical reversing means. The half of the mold closing unit which is located on one side of the parting plane of the casting mold is entirely axially displaceable within limits and is effective upon electromechanical reverse switching means if the amount of the axial displacement is substantially changed due to the presence of foreign bodies.

One of the mold clamping plates is resiliently mounted with respect to a stationary supporting base plate or mold portion. On this mold clamping plate, two microswitches are mounted, which are inserted in the control circuit of the hydraulic drive, the switches being of opposite switching direction. One of the microswitches is disposed in the path of movement of an axial displaceable switching bar of the movable mold clamping plate, and the other microswitch is disposed on the extension of the axis of a switching bar of the supporting plate and which bar is also displaceable in the axial direction.

Additional objects and advantages of the present invention will become apparent upon consideration of the following description when taken in conjunction with the accompanying drawings in which:

FIGURE 1 is a sectional view illustrating the safety mold closing unit with the hydraulic drive omitted.

FIGURE 1a is a schematic view of the electromechanical switching unit of the safety device illustrated in FIGURE 1.

FIGURE 2 is a bottom view of the structure illustrated in FIGURE 1, with certain parts shown in section, and wherein the casting mold (shown in phantom lines) is not yet completely closed.

FIGURE 3 is a view similar to FIGURE 2 but wherein the casting mold is completely closed.

With more particular reference to the drawings, a pair of supporting rods 3 and 5 are connected with the machine frame by means of mounting elements 2 and 6. A stationary supporting mold portion 1 is fixed to one end of the pair of rods. A mold clamping plate 4 which is displaceable by the hydraulic drive of the mold closing unit in the closing direction $a$ is slidably mounted on the rod pair 3, 5.

A further clamping plate 7 is also displaceably mounted on the pair of rods 3 and 5 and is resiliently mounted with respect to the stationary supporting mold portion 1. The possible amplitude of movement of this mold clamping plate 7 is in the order of millimeters. Four hollow screws 21 are anchored in the clamping plate 7 in a diagonal arrangement. These clamping screws pass through corresponding bores in the supporting mold portion 1 and are provided with flange-like stops 21' for aid in limiting the amplitude and thus the maximum distance between the mold clamping plate 7 and the supporting mold portion 1.

One of the mold halves 16, shown in phantom lines, is mounted to the mold clamping plate 7 by threaded bolts 19 which pass through the hollow bolts 21 after first passing through spacer sleeves 20 disposed directly behind the hollow bolts in the rear of the unit. When the casting mold is opened, the clamping plate 7 under the effect of cup or disc spring sets 23 is at a maximum distance from the mold base portion 1. The disc springs of each set are disposed on bolts 22 which are threadedly engaged with the supporting mold portion or base plate 1.

An axially adjustable switching bar 10 is fastened to the movable clamping plate 4. This bar is received in a bearing block 12 and may be locked therein in any desired position with the use of an arresting screw 11. A guide sleeve 9 is provided in the clamping plate 7 and is positioned coaxially with the switching bar 10 so that this guide sleeve provides an accurate guidance of the switching bar 10.

A microswitch 8 is provided in the vicinity of the guide sleeve 9 on that side of resiliently mounted clamping plate 7 which faces toward the mold base portion 1. This microswitch has a switching roller 8' which projects into the path of motion of the switching bar 10. A further switching bar 14 is received by a bearing block 15 mounted on the mold base portion 1 in an axially displaceable manner. This further switching bar 14 cooperates with a further microswitch 13 which, in a similar manner to microswitch 8, is mounted to the resiliently disposed clamping plate 7. The switching roller 13' of this microswitch is positioned to be engaged by the switching bar 14 when the mold clamping plate 7 is moved. Both microswitches 8 and 13 are connected in the control circuit of the hydraulic drive device; as shown in the drawings, both microswitches 8 and 13 are located within the confines of the contour of the plate 7 so that neither of the two switches projects beyond the lateral limits of the plate, in consequence of which the switches do not require any additional lateral space. The electric valve EV of the hydraulic drive means DM is controlled by this control circuit C in a suitable manner so that when the control circuit is closed the piston of the hydraulic cylinder is urged toward movement in a direction which causes closing of the mold closing unit. When the control circuit is open the piston is biassed in a direction which initiates opening movement and this direction is opposite to the first-mentioned direction.

In order to initiate the injection operation after the casting mold has been completely closed, the force transmitting lever system of the mold clamping device must be in a completely straight position, that is, with the toggle arms of the lever system being straight, since this straight position electromechanically initiates the injection operation. A further prerequisite is that the control circuit of the hydraulic drive must be closed. This straight position of the lever system means, for example, that the toggle levers are aligned and the lever system may, for example, be of the type described in U.S. Patent No. 3,015,131.

The contact of microswitch 8 is closed when the switching bar 10 engages the switching roller 8' of microswitch 8. Since this microswitch is engaged by the switching bar 10 before the resiliently mounted mold clamping plate 7 is pressed against the mold base portion 1 during the course of a further closing movement, the switching contact in microswitch 8 is closed before the bent levers of the force transmitting lever system of the mold clamping device have attained their maximum stretched or aligned position.

When the switching roller 13' of microswitch 13 contacts the switching bar 14, the switching contact in this microswitch 13 is thereby opened. This also occurs before the bent levers of the force transmitting lever system have attained their maximal stretched or aligned position. The switching bar 10 must be locked in its bearing block 12 in a position whereby it abuts the switching roller 8' of microswitch 8 when the mold half 17, shown in phantom lines, of the casting mold meets the mold half 16 and while there is a spacing still present between the resiliently mounted clamping plate 7 and the supporting base plate 1. A fine adjustment of the switching bar 10 which must be carried out has its magnitude dependent on the mounting or installation height of the casting mold.

The switching bar 14 must be locked in its bearing block 15 in a position which assures that it abuts the switching roller 13' of microswitch 13 during the course of the closing motion of the unit and thus during the course of the corresponding motion of the resiliently mounted clamping plate 7 directly after the contact in microswitch 8 is closed. By this means, the switching bar 14 opens the switching contact of microswitch 13. The above-mentioned chronological sequence of the contact switching operation of the two microswitches 8 and 13 must ensure that in each case the control circuit remains closed. Since the switching contacts of both microswitches 8 and 13 are disposed in the control circuit of the hydraulic drive means for the mold closing device, the control circuit is interrupted only if the contact in microswitch 13 is opened by switching bar 14 before the contact in microswitch 8 is closed.

An accurate sensitive adjustment of the switching bars 10 and 14, which becomes the prerequisite for a chronologically accurate operation of the switching processes in the microswitches 8 and 13, provides the result that any type of foreign body, and even one of the smallest dimensions such as a hair, which is present between the casting mold halves prevents the closing of the contact in the microswitch 8 but does not prevent opening of the contact in the microswitch 13. As a result, the control circuit is interrupted at which time the electric valve of the hydraulic cylinder of the drive device is reversed in such a manner that the direction of movement of the mold clamping device is reversed.

If the mold closing unit operates flawlessly, that is, with no foreign bodies disposed between the mold halves, the contact in microswitch 8 is closed and directly thereafter the contact in microswitch 13 is opened. Thus, the control circuit remains constantly closed. In the course of the further closing motion, the resiliently mounted clamping plate 7 engages the mold base plate 1 and the bent lever system attains its absolutely straight position whereby the injection operation is initiated.

If the operation is disturbed by the presence of foreign bodies, then the switching bar 10 can no longer reach the switching roller 8' of microswitch 8 during the course of the closing movement of the mold clamping unit. The reason for this is that the position of the switching roller 8' is adjusted to the mounting depth of the casting mold and this depth has been changed by the foreign body which is disposed between the mold halves, even if this change is only minor. The switching bar 14 in any event opens the switching contact in microswitch 13 so that the control circuit is interrupted. The electric valve of the drive is therefore reversed and the direction of motion of the mold closing unit is reversed and the casting mold opens.

It will be understood that the above description of the present invention is susceptible to various modifications, changes, and adaptations, and the same are intended to be comprehended within the meaning and range of equivalents of the appended claims.

What is claimed is:

1. In a hydraulically driven safety mold closing device of an injection molding machine for thermoplastic materials having a hydraulic drive and a control circuit for precluding the closing of the casting mold halves under a pressure which normally keeps the halves closed when a foreign body is present between the casting mold halves by controlling the moving portions of the unit which are moved in the closing direction to actuate electromechanical reversing means, the improvement comprising:

a stationary mold base plate;
    a mold clamping plate resiliently supported with respect to said stationary mold base plate;
    a mold clamping plate movable toward and away from said base plate;
    two microswitches mounted on said resiliently supported mold clamping plate and disposed in the control circuit of the hydraulic drive and arranged to switch in opposite directions;
    a first axially displaceable switching bar mounted on the movable mold clamping plate in a position so that one of said microswitches is in its path of movement; and
    a second axially adjustable switching bar disposed on said mold base plate and arranged so that the other microswitch is disposed in its axial extension; said one microswitch being mounted on the side of said resiliently mounted plate which faces away from said movable plate, said resiliently mounted plate having a bore therethrough in the region of the path of movement of said first switching bar with the edge of this bore extending from said one microswitch.

2. A device as defined in claim 1 wherein said one microswitch is arranged to close when actuated by said first switching bar, and said other microswitch is arranged to open when actuated by said second switching bar.

3. A device as defined in claim 1 comprising sets of pretensioned disc springs disposed between said base plate and said resiliently supported plate.

4. A device as defined in claim 3 comprising hollow screws passing through said base plate and anchored in said resiliently mounted plate.

5. A device as defined in claim 4 wherein said hollow screws each include a flange-like stop on the other side of said base plate from said resiliently mounted plate to limit the amount of movement of the latter with respect to the former.

6. A device as defined in claim 2 wherein said first switching bar is arranged so that its free end engages the actuating member of said one microswitch when the casting mold is closed and there is still a distance between the resiliently mounted plate and said base plate.

7. A device as defined in claim 2 wherein said second switching bar is arranged so that its free end engages the actuating member of said other microswitch when the casting mold is closed and there is still a distance between the resiliently mounted plate and said base plate.

8. A device as defined in claim 2 wherein said first switching bar is arranged so that its free end engages the actuating member of said one microswitch when the casting mold is closed and there is still a distance between the resiliently mounted plate and said base plate, said second switching bar is arranged so that its free end engages the actuating member of said other microswitch when the casting mold is closed and there is still a distance between the resiliently mounted plate and said base plate, said switching bars being disposed so that during the closing movement the free end of said first switching bar engages the actuating member of said one microswitch immediately before said second switching bar engages the actuating member of said other microswitch.

9. A device as defined in claim 2 wherein said microswitches include switching rollers, the switching axes of said microswitches extending parallel to the clamping plane of said resiliently mounted plate and at right angles to said switching bars.

10. A device as defined in claim 1 wherein both of said microswitches and both of said switching bars are located within the confines of the contour of said resiliently mounted plate.

11. A device as defined in claim 10 wherein said other microswitch is likewise mounted on said side of said resiliently mounted plate which faces away from said movable plate.

References Cited by the Examiner
UNITED STATES PATENTS

| | | | |
|---|---|---|---|
| 2,801,442 | 8/1957 | Moslo | 18—16 |
| 3,071,813 | 1/1963 | Lemoine | 18—30 |

J. SPENCER OVERHOLSER, *Primary Examiner.*

W. L. McBAY, *Assistant Examiner.*